US010625680B1

(12) United States Patent
Koehler et al.

(10) Patent No.: US 10,625,680 B1
(45) Date of Patent: Apr. 21, 2020

(54) SEATING ASSEMBLY

(71) Applicant: Ford Global Technologies, LLC, Dearborn, MI (US)

(72) Inventors: Juergen Koehler, Köln (DE); Linh Ngoc Doan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/176,057

(22) Filed: Oct. 31, 2018

(51) Int. Cl.
*B60R 7/04* (2006.01)
*B60N 2/30* (2006.01)
*B60N 2/32* (2006.01)
*B60R 11/00* (2006.01)
*A47C 7/62* (2006.01)

(52) U.S. Cl.
CPC .............. *B60R 7/043* (2013.01); *A47C 7/624* (2018.08); *A47C 7/628* (2018.08); *B60R 11/00* (2013.01); *B60R 2011/0082* (2013.01); *B60R 2011/0094* (2013.01)

(58) Field of Classification Search
CPC . B60R 7/043; B60R 11/00; B60R 2011/0082; B60R 2011/0094; A47C 7/624; A47C 7/628
USPC ........................................ 297/188.08–188.13
See application file for complete search history.

(56) References Cited

U.S. PATENT DOCUMENTS

| | | | | |
|---|---|---|---|---|
| 5,096,249 A * | 3/1992 | Hines | ...................... | B60R 7/043 297/188.11 X |
| 5,762,307 A | 6/1998 | Patmore | | |
| 5,816,650 A * | 10/1998 | Lucas, Jr. | ............ | B60N 2/3045 297/188.1 |
| 5,890,758 A | 4/1999 | Pone et al. | | |
| 6,161,896 A * | 12/2000 | Johnson | ................... | B60R 7/043 297/188.08 |
| 6,386,612 B2 * | 5/2002 | Hofmann | ................ | B60R 7/043 224/275 |
| 6,390,547 B1 * | 5/2002 | Spykerman | .......... | B60N 2/3047 297/188.1 X |
| 6,869,121 B2 * | 3/2005 | Kayumi | .................... | B60N 2/01 297/188.1 X |
| 6,877,807 B2 * | 4/2005 | Mizuno | .................. | B60N 2/305 297/188.08 |
| 7,014,241 B2 * | 3/2006 | Toyota | ................. | B60N 2/3018 296/37.15 |
| 7,048,320 B2 * | 5/2006 | Rubel | ....................... | B60R 7/02 296/37.6 |
| 7,121,606 B2 * | 10/2006 | Khan | ...................... | B60R 7/043 297/188.1 X |
| 7,401,857 B2 * | 7/2008 | Laux | ....................... | B60N 2/06 297/188.04 |
| 7,527,315 B2 * | 5/2009 | Sumida | ................. | B60R 13/011 297/188.08 X |
| 7,611,183 B2 * | 11/2009 | Burkey | .................. | B60N 2/206 296/37.15 |

(Continued)

*Primary Examiner* — Rodney B White
(74) *Attorney, Agent, or Firm* — David Coppiellie; Price Heneveld LLP

(57) ABSTRACT

A vehicle including first and seating assemblies positioned within a single seating row defining a space positioned therebetween. A storage member is operable between an undeployed position within a member space defined below a seat base of the first seating assembly and a deployed position within the space between the first and second seating assemblies via a linkage.

19 Claims, 7 Drawing Sheets

(56) References Cited

U.S. PATENT DOCUMENTS

| | | | | |
|---|---|---|---|---|
| 7,914,074 B2* | 3/2011 | Lindsay | ............... | B60R 7/02 |
| | | | | 297/188.11 X |
| 8,308,238 B2* | 11/2012 | Imaoka | ............ | B60N 2/688 |
| | | | | 297/188.08 X |
| 9,090,209 B2* | 7/2015 | Aguirre | ............... | B60R 7/043 |
| 9,421,915 B2* | 8/2016 | Kalergis | ............ | B60R 7/043 |
| 9,908,623 B2* | 3/2018 | Hashberger | ........ | B64D 11/00 |
| 10,086,766 B2* | 10/2018 | Osterhoff | .......... | B60N 2/682 |
| 2002/0005649 A1* | 1/2002 | Hofmann | ........... | B60R 7/043 |
| | | | | 297/188.1 X |
| 2006/0006704 A1 | 1/2006 | Skelly et al. | | |
| 2009/0115229 A1 | 5/2009 | Messner et al. | | |
| 2010/0007163 A1* | 1/2010 | Almeida | ............ | B60N 2/062 |
| | | | | 297/188.11 X |
| 2016/0009398 A1* | 1/2016 | Klettke | ............... | B60N 2/90 |
| | | | | 297/188.1 X |
| 2019/0232878 A1* | 8/2019 | Welch | ............... | B60N 2/809 |

* cited by examiner

SEATING ASSEMBLY

FIELD OF THE DISCLOSURE

The present disclosure generally relates to a seating assembly, and more specifically a vehicle seating assembling having a storage member.

BACKGROUND OF THE DISCLOSURE

Vehicles may not include enough storage space for passengers when the vehicle includes a removable seat and/or a walkway between first and second seats within a row of seats. Conventional storage space includes the vehicle floor for bags and larger items or the trunk compartment. Further, additional storage space may not be available in conventional vehicle seats unless the seat back is folded flat over the seat base.

SUMMARY OF THE DISCLOSURE

According to at least one feature of the present disclosure, a vehicle includes first and second seating assemblies positioned within a single seating row defining a space positioned therebetween. A storage member is operable between an undeployed position within a member space defined below a seat base of the first seating assembly and a deployed position within the space between the first and second seating assemblies via a linkage.

According to another feature of the present disclosure, a vehicle seating assembly includes a seat back and a seat base coupled to the seat back. The seat base is moveable between opened and closed positions. A storage member is operable between an undeployed position within a member space defined below the seat base and a deployed position to a side of the seat base via a linkage.

According to another feature of the present disclosure, a vehicle seating assembly includes a seat back and a seat base coupled to the seat back. The seat base is moveable between opened and closed positions. A storage member is pivotally coupled to a linkage such that the storage member is operable between an undeployed position beneath the seat base and a deployed position proximate the seat base.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1A:
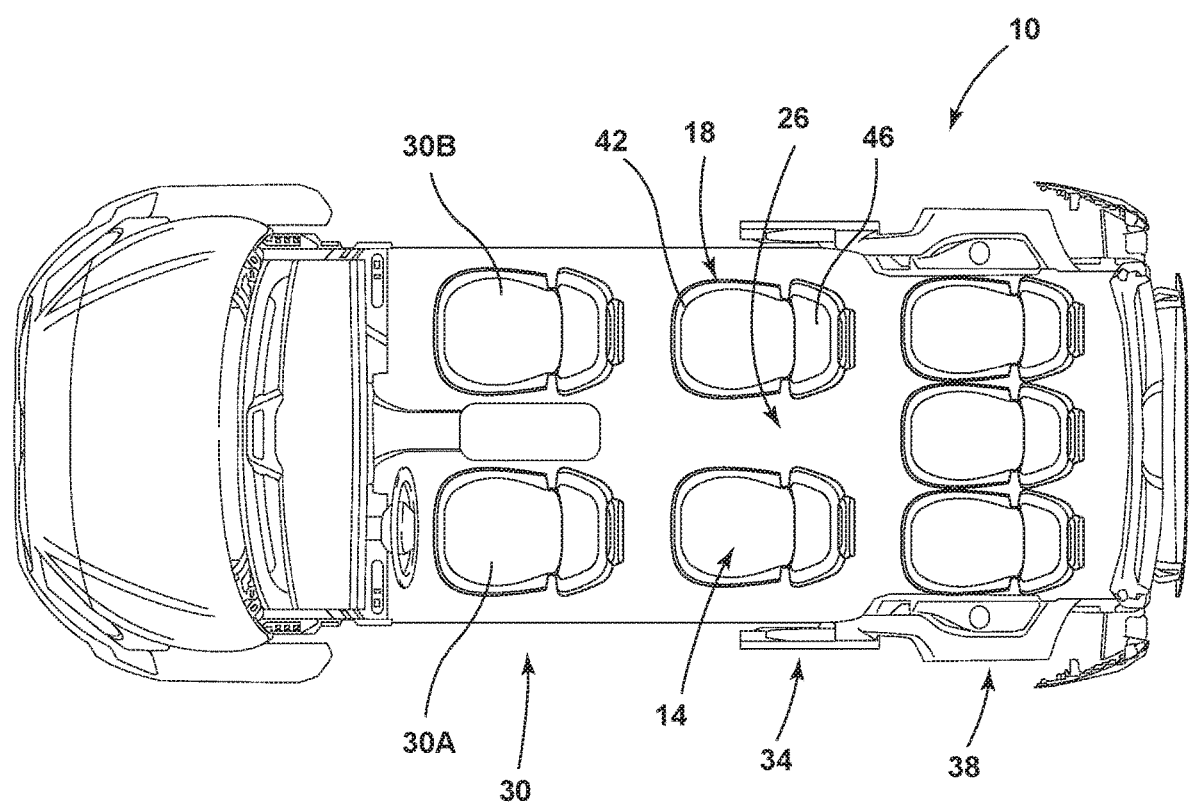
FIG. 1A is a top view of a vehicle, according to at least one example.

Additional features and advantages of the disclosure will be set forth in the detailed description which follows and will be apparent to those skilled in the art from the description, or recognized by practicing the disclosure as described in the following description, together with the claims and appended drawings.

For purposes of description herein, the terms "upper," "lower," "right," "left," "rear," "front," "vertical," "horizontal," and derivatives thereof shall relate to the concepts as oriented in FIG. 1. In this document, relational terms, such as first and second, top and bottom, and the like, are used solely to distinguish one entity or action from another entity or action, without necessarily requiring or implying any actual such relationship or order between such entities or actions. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Referring to FIGS. 1-4D, depicted is a vehicle 10 including first and second seating assemblies 14, 18 within a single seating row defining a space 26 positioned therebetween. In the depicted example, the vehicle 10 includes a first seating row 30, a second seating row 34, and a third seating row 38. The first and second seating assemblies 14, 18 include a seat base 42 coupled to a seat back 46. A storage member 50 is operable between an undeployed position (FIG. 4B) within a member space 54 defined below the seat base 42 of the first seating assembly 14 and a deployed position (FIG. 2) within the space 26 between the first and second seating assemblies 14, 18 via a linkage 58.

Figure 1B:
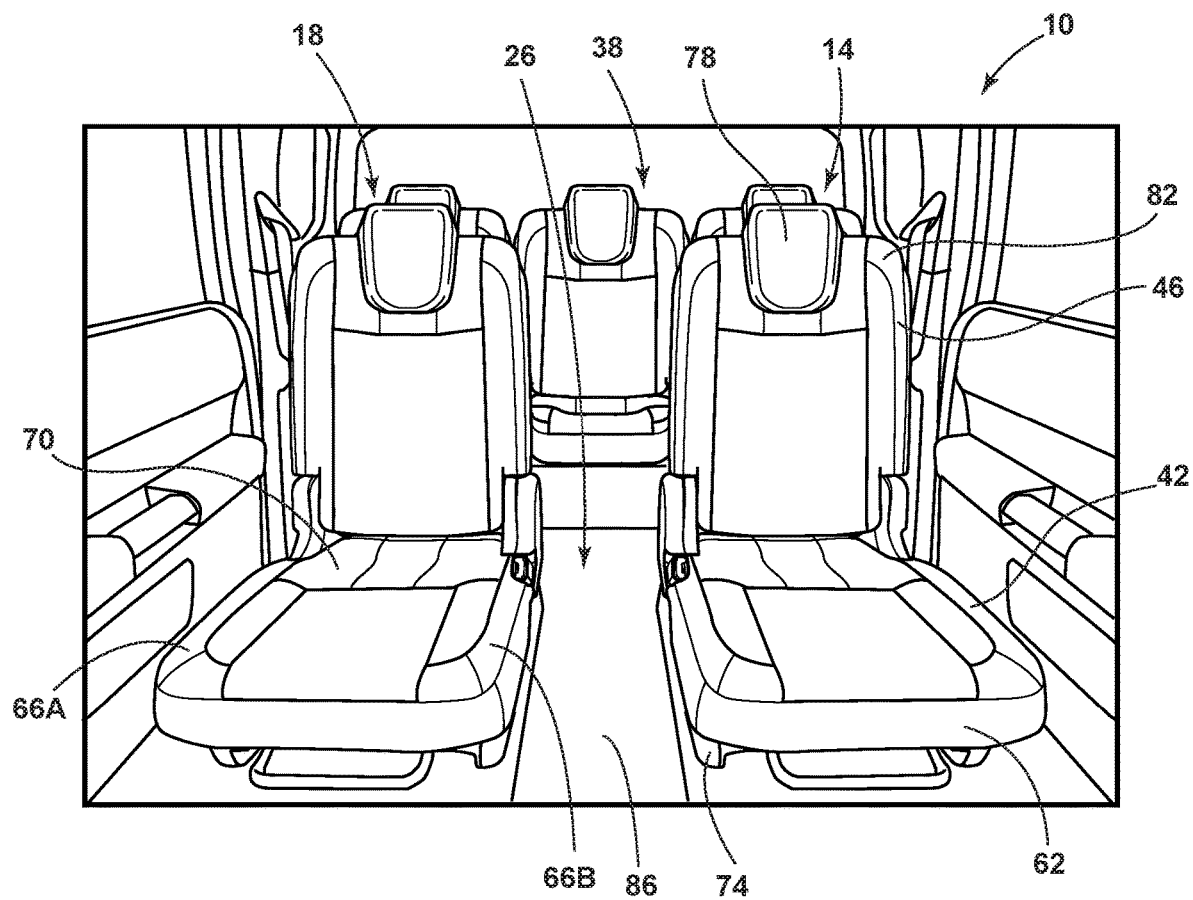
FIG. 1B is a perspective front view of an interior of the vehicle, according to at least one example.

Referring to FIGS. 1A and 1B, the first seating row 30 can include more than one seating assembly horizontally aligned within the vehicle 10. According to various examples, the first seating row 30 may include a driver seat 30A and a passenger seat 30B. In the depicted example, the first and second seating assemblies 14, 18 are positioned in the second seating row 34. It will be understood that the first and second seating assemblies 14, 18 can be positioned within the first seating row 30, the third seating row 38, and/or another additional seating row within the vehicle 10. The first and second seating assemblies 14, 18 may be positioned within the same seating row. In various examples, the seating row may include the first seating assembly 14, the second seating assembly 18, and/or additional seating assemblies. It will be understood, that a seating row can include a single seating assembly. It will also be understood that the first and second seating assemblies 14, 18 can be utilized as stand-alone seats in conventional, autonomous, and/or shared ride vehicles.

Figure 2:
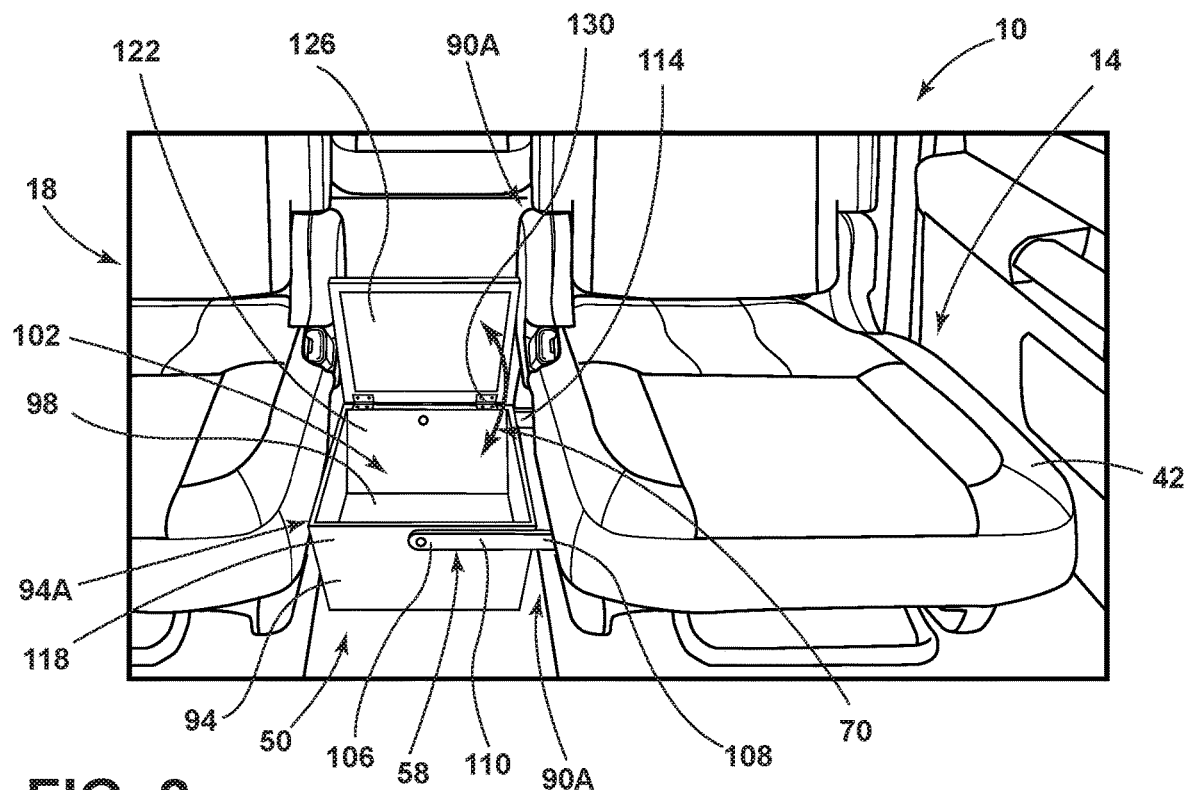
FIG. 2 is a perspective front view of a storage member and a seating assembly, according to at least one example.

The first and second seating assemblies 14, 18 can include the seat base 42 coupled to the seat back 46. As shown in the depicted example, the seat base 42 is moveable between an opened position (FIG. 4B) and a closed position (FIG. 1B). In other words, the seat base 42 can be pivotable. In various examples, the seat base 42 may be in the opened position when the seat base 42 is oriented substantially vertical. The seat base 42 can be pivotally coupled to the seat base 42. In other words, the seat base 42 may be configured to pivot in a vehicle-forward direction from the closed position to the opened position. According to various examples, the seat base 42 is configured to pivot in a direction opposite and away from the seat back 46. It will be understood that the seat base 42 can be configured to pivot in a vehicle-rearward, a vehicle-inboard, and/or a vehicle-outboard direction. When the seat base 42 is in the opened position, the member space 54 (FIG. 4B) can be accessible, which can house the storage member 50 (FIG. 2). In the depicted example, the storage member 50 (FIG. 4B) may be accessed by a user when the seat base 42 is in the opened position (FIG. 4B). The storage member 50 (FIG. 2) can be operable between the deployed and undeployed positions, when the seat base 42 is in the opened position.

Still referring to FIGS. 1A and 1B, in the depicted example, the seat base 42 is in the closed position when the seat base 42 is oriented substantially horizontal. When in the closed position, lateral edge portions 66A, 66B of the seat base 42 may be positioned on a support 74. The member space 54 (FIG. 4B) may not be accessible when the seat base 42 is in the closed position. In various examples, the storage member 50 (FIG. 2) cannot be accessed by a user when the seat base 42 is in the closed position and the storage member 50 is in the undeployed position such that the storage member 50 is substantially hidden from the view of a passenger. The storage member 50 (FIG. 4B) can be accessible by a user when the seat base 42 is in the closed positioned when the storage member 50 is in the deployed position proximate the seat base 42.

As explained previously, the seat back 46 can be coupled to the seat base 42. The seat back 46 may be coupled to the vehicle-rearward edge portion 70 of the seat base 42. The seat back 46 may be operable between an upright position and a folded position, wherein the seat back 46 is positioned over the seat base 42 when in the folded position. The seat back 46 may include a headrest 78 coupled to a top portion 82 of the seat back 46.

The first and second seating assemblies 14, 18 can be coupled to the support 74. The support 74 can be any structure sufficient to support the first and second seating assemblies 14, 18 and attach the first and second seating assemblies 14, 18 to a floor 86 of the vehicle 10. The support 74 may, at least partially, define the member space 54 (FIG. 4B). The support 74 may be configured to entirely enclose the member space 54 positioned beneath the seat base 42. In various examples, the support 74 may partially enclose the member space 54.

As described previously, in the depicted example, the first and second seating assemblies 14, 18 are positioned within a single seating row defining the space 26 positioned therebetween. The space 26 can be a sufficient size to position a removable seating assembly between the first and second seating assemblies 14, 18. In various examples, the space 26 may be a sufficient size to allow occupants to move through the space 26 to reach the third seating row 38.

Referring to FIG. 2, the vehicle 10 includes the storage member 50 that is operable between deployed and undeployed positions. In the depicted example, the undeployed position is beneath the seat base 42 and the deployed position is proximate the seat base 42. In various examples, the deployed position may be to the side 90 of the seat base 42. The deployed position may be at a vehicle-inboard side, the vehicle-outboard side, the vehicle-forward side, and/or the vehicle-rearward side of the seat base 42. The member space 54 (FIG. 4B) can be defined beneath the seat base 42 to provide a space for the storage member 50 to be positioned when in the undeployed position. In other words, the storage member 50 may be positioned within the member space 54 defined beneath the first seating assembly 14 when the storage member 50 is in the undeployed position and positioned to the side 90 of the seat base 42 when the storage member 50 is in the deployed position and may be operable between the undeployed and deployed positions via the linkage 58. In the depicted example, the deployed position of the storage member 50 is within the space 26 between the first and second seating assemblies 14, 18. When in the deployed position, the storage member 50 can be positioned on the floor 86 of the vehicle between the first and second seating assemblies 14, 18. In various examples, the storage member 50 may be positioned proximate the seat base 42 when in the deployed position. The storage member 50 can be configured to move in a vehicle-inboard direction from the undeployed position to the deployed position. It will be understood that the storage member 50 can be configured to move in a vehicle-outboard direction, vehicle-forward direction, vehicle-rearward direction, vehicle-inboard direction, and/or a combination thereof.

In various examples, the storage member 50 includes a wall 94 coupled to a base 98. It will be understood that the storage member 50 can include a plurality of walls 94 coupled to the base 98. In the depicted example, the storage member 50 includes a plurality of walls 94 and the base 98. The plurality of walls 94 and the base 98 can be, for example, substantially planar, define corrugations and ridges, and/or conform to a shape items positioned within the storage member 50. The wall 94 and the base 98 may be formed of a material that retains its structure, such as, for example, plastics. According to various examples, the wall 94 and the base 98 may be formed of a material that does not retain its shape, such as, for example, fabrics and/or netting. In such examples, the storage member 50 may include a support structure, wherein fabric is coupled to the support structure to provide a storage cavity 102 therewithin. The storage member 50 may be a circle, an oval, a triangle, a square, a rectangle, or any other higher order polygon.

Referring still to FIG. 2, in the depicted example, the storage member 50 defines the storage cavity 102. The storage member 50 can define the storage cavity 102 in the deployed and/or undeployed positions. As explained previously, the storage member 50 may be formed of a flexible material, such as, fabric and/or netting. In other words, the storage member 50 can be flexible. The storage member 50 may be configured to collapse when in the undeployed position beneath the seat base 42. It may be advantageous to include a collapsible example of the storage member 50 if the member space 54 (FIG. 4B) is not of a suitable size to house the storage member 50 in an uncollapsed form.

The storage member 50 can be operable between the undeployed position and the deployed position via the linkage 58. In various examples, the linkage 58 may be a guide arm and/or a hinge. The storage member 50 may be pivotally coupled to the linkage 58. In the depicted example, the storage member 50 is pivotally coupled to the linkage 58 such that the storage member 50 is configured to keep the same orientation as the storage member 50 moves between the undeployed position beneath the seat base 42 and the deployed position proximate the seat base 42. In other words, the storage member 50 can stay in an upright position while moving so items stay within the storage cavity 102. It may be advantageous to pivotally couple the storage member 50 to the linkage 58 such that the storage member 50 can retain items while moving between the deployed and undeployed positions and prevent items from falling out of the storage member 50.

As explained above, according to various examples, the storage member 50 can be coupled to the seat base 42 via the linkage 58. The linkage 58 may be, for example, a hinge, a bar linkage, a multiple bar linkage, a guide arm, and/or a combination thereof. In the depicted example, the linkage 58 is a single bar linkage. It will be understood, that the linkage 58 may be a double bar linkage. In various examples, the linkage 58 may be a hinge. The linkage 58 may be coupled to the storage member 50 at a first end portion 106. The first end portion 106 may be pivotally coupled to the storage member 50 such that the first end portion 106. According to various examples, the linkage 58 may be pivotally coupled to the first seating assembly 14 at a second opposing end portion 108. In the depicted example, the linkage 58 is pivotally coupled to the side 90 of the first seating assembly 14. In the depicted example, the linkage 58 is coupled to the vehicle-inboard side of the seat base 42. The linkage 58 can be a length to allow the storage member 50 to move between the deployed and undeployed positions, when the storage member 50 is collapsed. In various examples, the linkage 58 can be a length to allow the storage member 50 to be moved between the deployed and undeployed positions, when the storage member 50 is not collapsed. The linkage 58 may be extendable and/or interchangeable to accommodate different sized storage members 50.

Referring further to FIG. 2, in various examples, the linkage 58 includes a first linkage 110 and a second linkage 114 coupled to different locations on the storage member 50. The first and second linkages 110, 114 may be coupled to opposing sides of the storage member 50. In other words, the linkage 58 can include first and second linkages 110, 114 coupled to opposing sides of the storage member 50. In the depicted examples the first and second linkages 110, 114 are coupled to a front side 118 and a rear side 122 of the storage member 50, respectively. The front side 118 of the storage member 50 may be a vehicle-forward side, and the rear side 122 of the storage member 50 may be a vehicle-rearward side. In other words, the front side 118 can be a seating assembly-forward and/or a vehicle-forward side and the rear side 122 can be a seating assembly-rearward and/or vehicle-rearward side.

The storage member 50 may include a cover 126. The cover 126 can be operable between covered and uncovered positions. In various examples, the cover 126 may be coupled to the storage member 50. The cover 126 may be coupled to the storage member 50 by a hinge 130. In the depicted example, the cover 126 is coupled to the vehicle-rearward edge portion of the storage member 50. The cover 126 may be pivotally coupled to the storage member 50 such that the cover 126 is operable between the covered and uncovered positions. In other words, the vehicle 10 may include the storage member 50 and a cover 126 pivotally coupled to an edge portion of the storage member 50. The cover 126 may be configured to pivot in a vehicle-forward direction from the covered position to the uncovered position. In the depicted example, the cover 126 is coupled to a vehicle-rearward edge portion of the storage member 50. It will be understood that the cover 126 can be coupled to a vehicle-forward edge portion and/or a lateral edge portion of the storage member 50.

In various examples, the cover 126 may be configured to fully cover the storage cavity 102 defined by the storage member 50. The cover 126 may be configured to partially cover the storage cavity 102. When in the covered position, the cover 126 may be positioned on a top surface of the storage member 50. The cover 126 can be configured to seal the storage cavity 102. In various examples, the cover 126 may be configured to latch to the storage member 50 in a separate location from where the cover 126 is coupled to the storage member 50. In various examples, when the cover 126 is in the covered position the cover 126 can be configured to be used as a tray or a table for an occupant in the vehicle 10.

Figure 3:
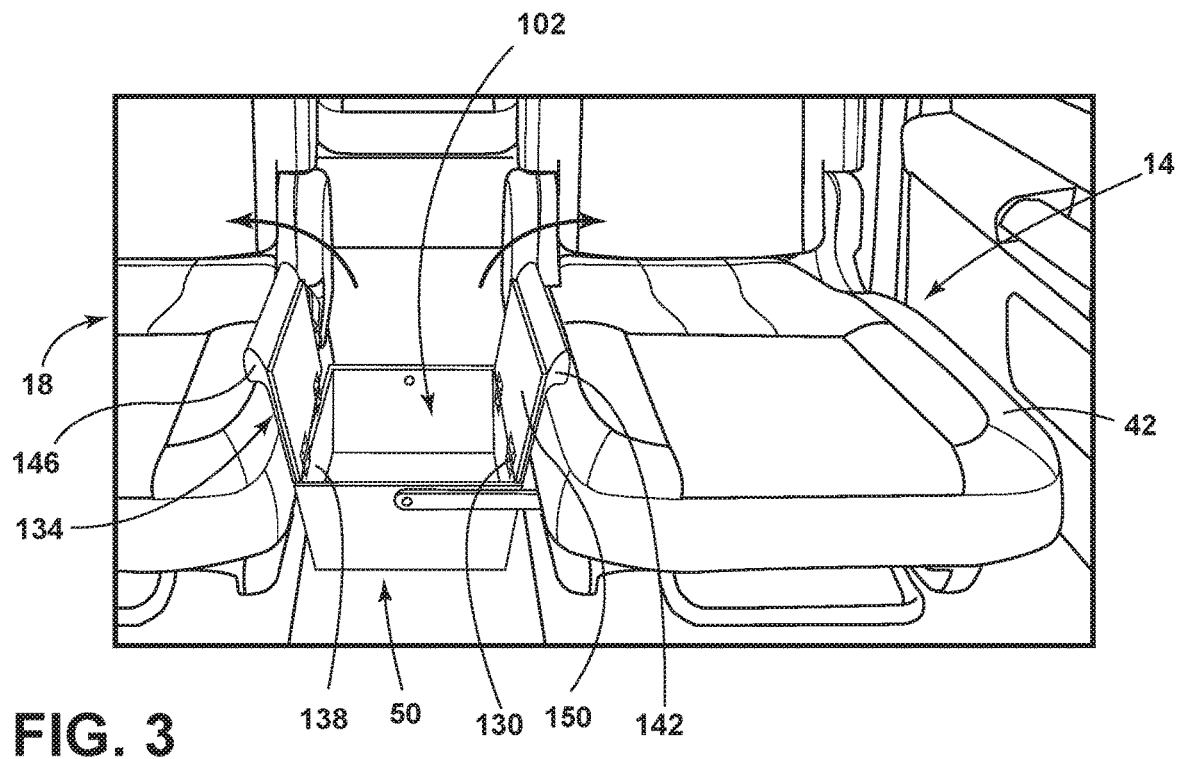
FIG. 3 is a perspective front view of the storage member, according to at least one example.

Referring now to FIG. 3, the storage member 50 may include an armrest 134 coupled to an interior surface 138 of the storage member 50. According to various examples, the armrest 134 can be coupled to the cover 126. The armrest 134 may be folded into the storage cavity 102 of the storage member 50. In such examples, the armrest 134 can be in a nonresting position such that a passenger cannot use the armrest 134. The armrest 134 can be extended from the storage cavity 102 to provide a surface for a passenger to use. In such examples, the armrest 134 can be in a resting position and utilized by a passenger in at least one of the first and second seating assemblies 14, 18. In other words, the armrest 134 may be coupled to the storage member 50, wherein the armrest 134 is operable between the resting position and the nonresting position. The armrest 134 may be operable by, for example, a hinge, linkage, guide arm, and/or combination thereof. In the depicted example, the storage member 50 includes the first armrest 134A to be utilized by a passenger sitting on the first seating assembly 14 and the second armrest 134B to be utilized by a passenger sitting on the second seating assembly 18.

In various examples, the armrest 134 may be coupled to a panel 150 and/or the panel 150 may define the armrest 134. In such an example, the panel 150 allows the armrest 134 to extend to a greater height relative to the first and second seating assemblies 14, 18 and remain foldable to be positioned within the storage cavity 102. According to various examples, the panel 150 may be configured to act as the cover 126 when the armrest 134 is folded within the storage cavity 102. The panel 150 may be pivotally coupled to the interior surface 138 of the storage member 50, the armrest 134, and/or a combination thereof. In other words, the panel 150 can be coupled by the hinge 130 to the interior surface 138 of the storage member 50 at an opposing end compared to the armrest 134.

Referring now to FIGS. 4A-4D, the member space 54 may be defined by the seat base 42. In the depicted example, the member space 54 is positioned beneath the seat base 42. The member space 54 may be entirely enclosed by the seat base 42. In various examples, the member space 54 may not be entirely enclosed by the seat base 42. The member space 54 may be a suitable size to house the storage member 50. The member space 54 may be configured to house the storage member 50 in an uncollapsed form such that the storage member 50 may be used to store items when in the undeployed position. In various examples, the member space 54 may be configured to house a collapsed form of the storage member 50 such that the storage member 50 may not be filled with items when in the undeployed position. When in the collapsed form, the storage member 50 may be configured to hold some items but a lesser volume of the items compared to the uncollapsed form.

Figure 4A:
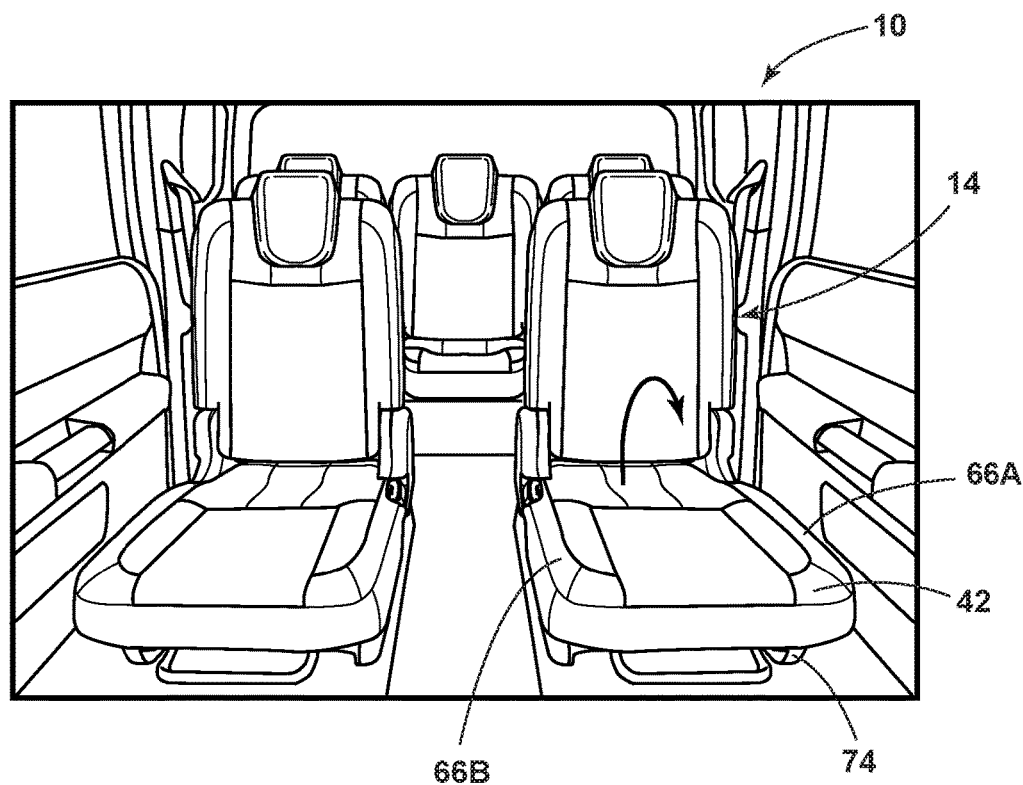
FIG. 4A is a perspective front view of the interior of the vehicle, according to at least one example.
Figure 4B:
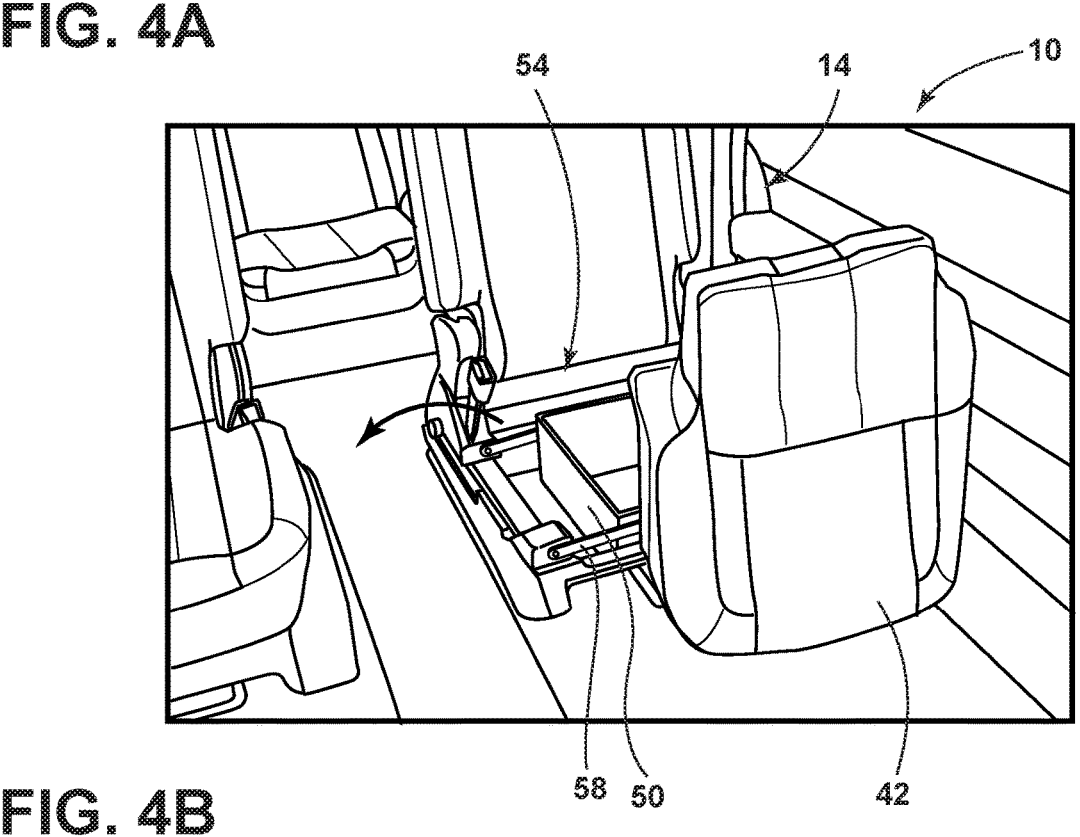
FIG. 4B is a perspective top view of the seating assembly, according to at least one example.

Referring still to FIGS. 4A-4D, in operation, the seat base 42 is operable between two positions. The seat base 42 is operable between the closed position (FIG. 4A) and the opened position (FIG. 4B). In the closed position, the seat base 42 is substantially horizontal such that the lateral edge portions 66A, 66B are positioned on the support 74. A passenger or occupant of the vehicle 10 may not access the member space 54 beneath the seat base 42 when the seat base 42 is in the closed position, as shown in FIG. 4A.

In the opened position, the seat base 42 is moved such that the member space 54 is accessible. In the depicted example, the seat base 42 pivots in a vehicle-forward direction to the opened position. When in the opened position, the seat base 42 may not be used as a seat for a passenger of the vehicle 10, as depicted in FIG. 4B.

Figure 4C:
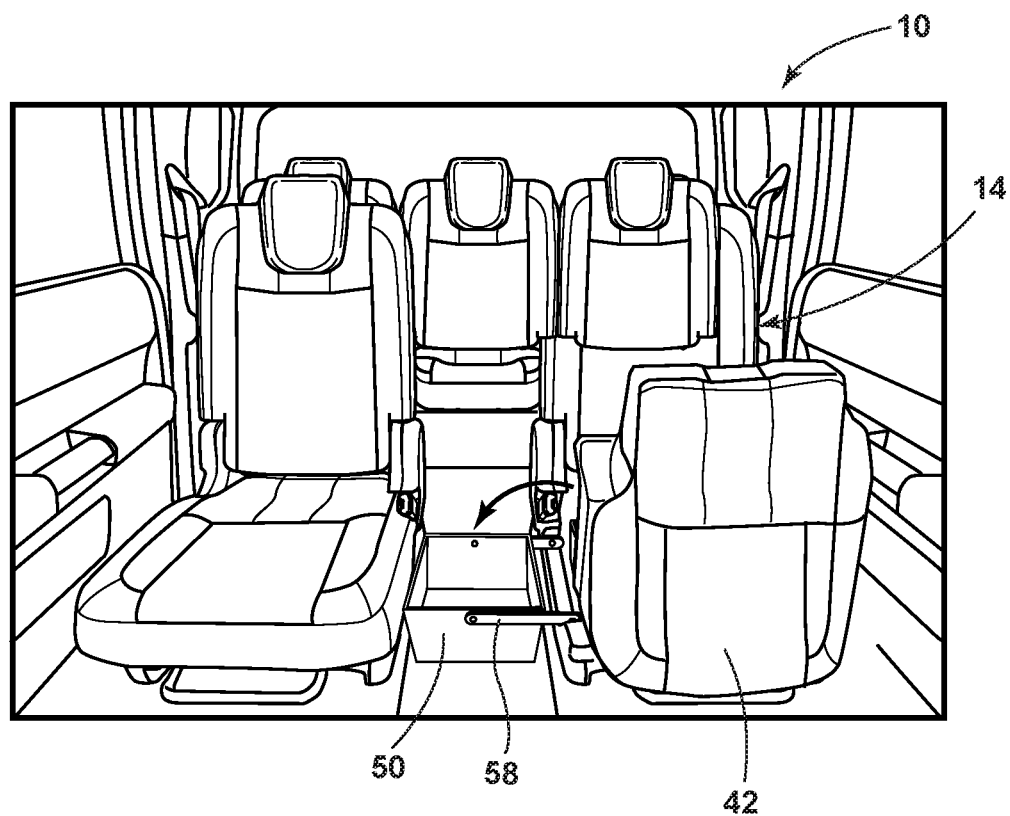
FIG. 4C is a perspective front view of the storage member and the seating assembly, according to at least one example.

As explained above, in operation, the storage member 50 is operable between two positions. The storage member 50 is operable between the undeployed position (FIG. 4B) and the deployed position (FIG. 4C). In the undeployed position, the storage member 50 is positioned within the member space 54 below the seat base 42 of the first seating assembly 14. As shown in FIG. 4B, a passenger or occupant of the vehicle 10 may access the member space 54 and/or the storage member 50 when the storage member 50 is in the undeployed position and the seat base 42 is in the opened position. The storage member 50 may hold items to be stored by a passenger when in the undeployed position. In various examples, a passenger may store items within the storage cavity 102 of the storage member 50 when the storage member 50 is in the undeployed position to remove the items from view of the vehicle occupants and/or remove the items from walkways within the vehicle 10.

Figure 4D:
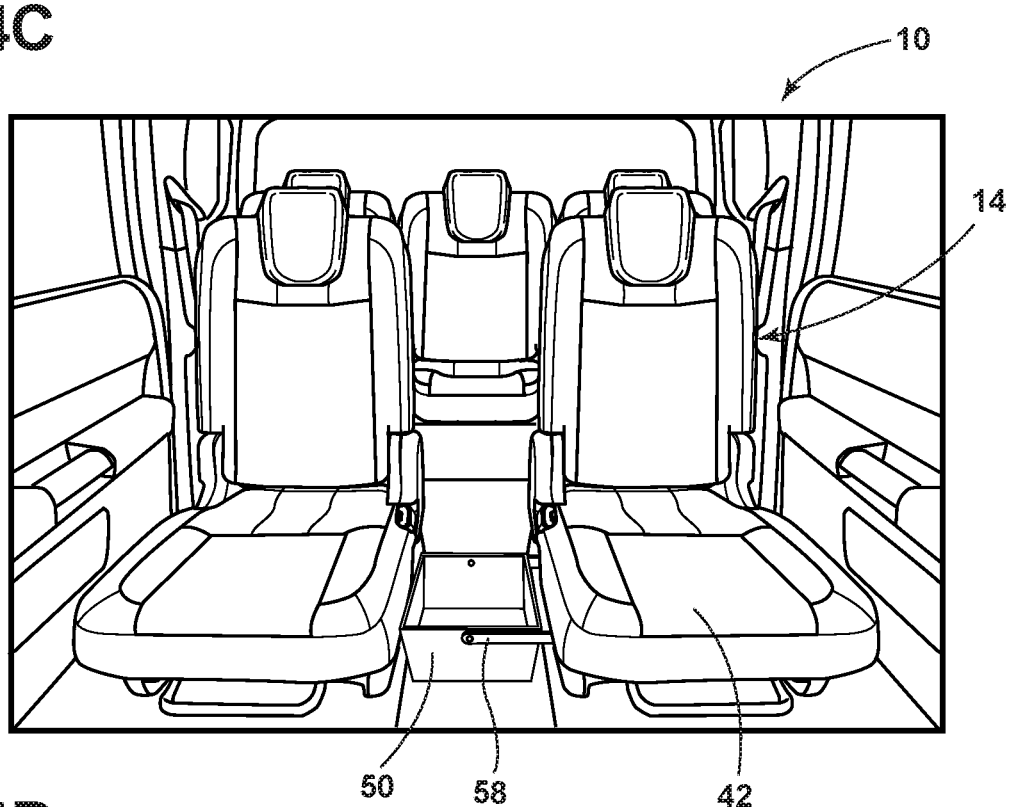
FIG. 4D is a perspective front view of the storage member and the seating assembly, according to at least one example.

As depicted in FIGS. 4B and 4C, the storage member 50 can be moved from the undeployed position to the deployed position via the linkage 58. The storage member 50 can be pivotally coupled to the linkage 58 such that the storage member 50 keeps the same orientation as the storage member 50 moves between the deployed and undeployed positions. It may be advantageous for the storage member 50 to keep the same orientation as the storage member 50 moves between the undeployed and deployed positions so as to prevent items from falling from the storage member 50 as the storage member 50 moves. In such examples, the storage member 50 can be used to store items when in the undeployed and deployed positions. When in the undeployed position, the seat base 42 can be moved to the closed position allowing vehicle occupants to store items within the storage member 50 and simultaneously utilize the first and/or second seating assemblies 14, 18 as seats, as shown in FIG. 4D. When in the deployed position, the armrests 134A, 134B (FIG. 3) may be operable between the resting and nonresting positions, where the nonresting position is stored within the storage cavity 102 of the storage member 50 and the resting position is extended vertically from the storage member 50 for use by a passenger.

Figure 5A:
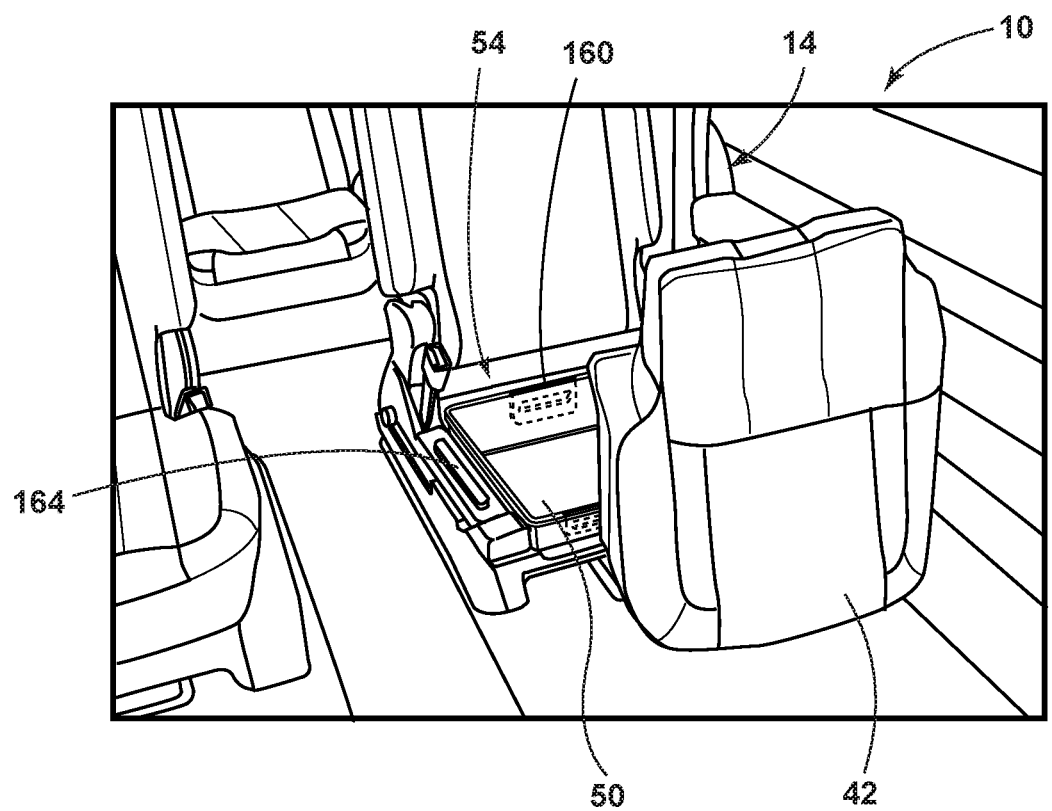
FIG. 5A is a perspective front view of the storage member removed from the seating assembly, according to at least one example.
Figure 5B:
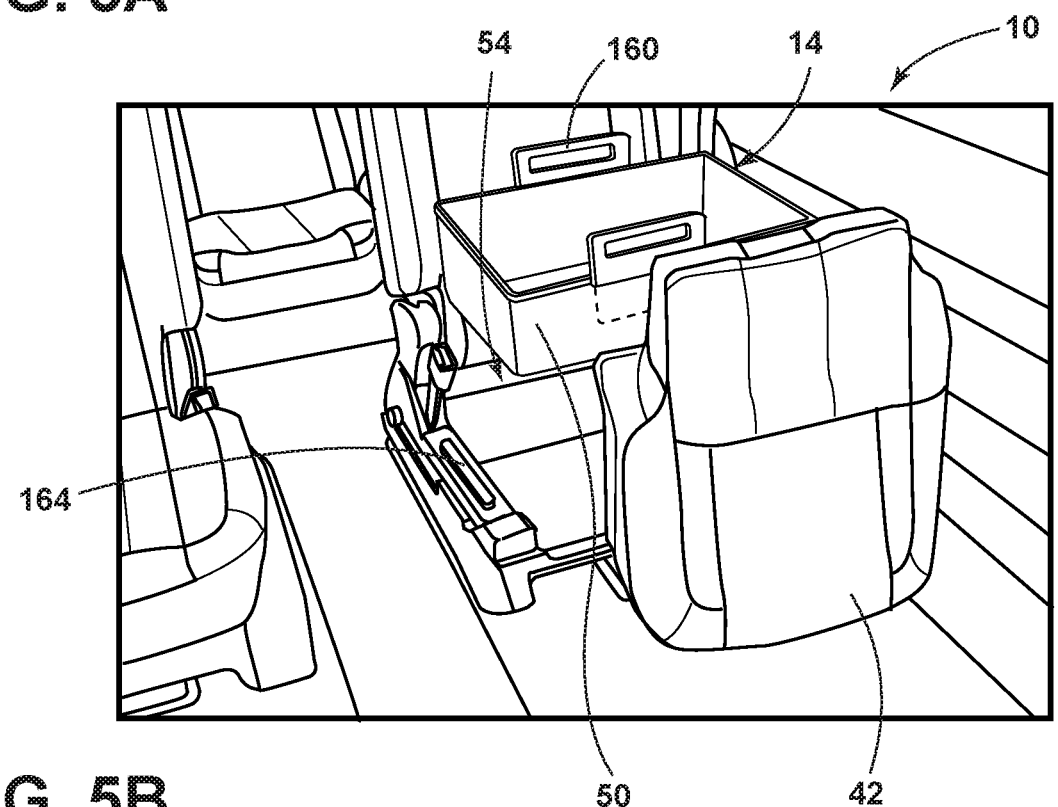
FIG. 5B is a perspective top view of the storage member removed from the seating assembly, according to at least one example.
Figure 5C:
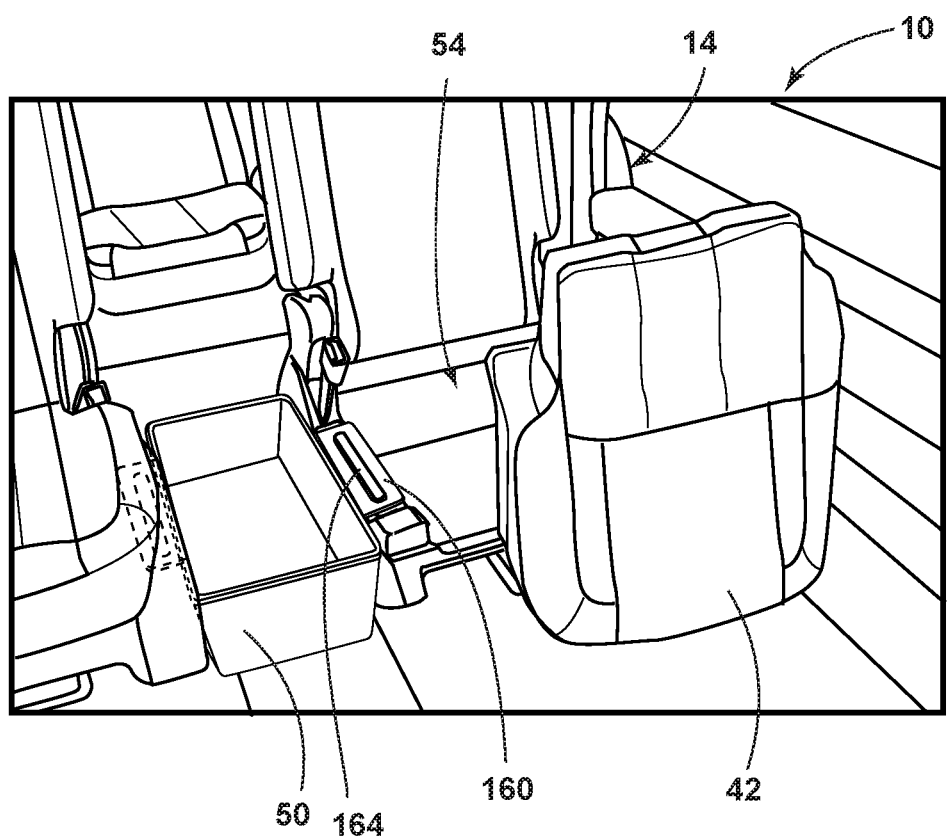
FIG. 5C is a perspective top view of the storage member positioned to a side of the seating assembly, according to at least one example.

Referring now FIGS. 5A-5C, depicted is an example of the storage member 50 which is not coupled to the seat base 42 through the linkage 58. As can be seen, the storage member 50 may freely sit within the member space 54 and be removed and placed where an occupant of the vehicle 10 desires. In the depicted example, the storage member 50 may define one or more handles 160 which the occupant may grip to remove the storage member 50 from the member space 54. The first seating assembly 14 may include an attachment feature 164. The attachment feature 164 may be positioned below the seat base 42 and/or other locations on the first seating assembly 14. The attachment feature 164 may be take a variety of configurations. For example, the attachment feature 164 may be a hook, half of a hook and loop system (e.g., Velcro®), a snap feature, other types of attachment features 164 and/or combinations thereof. According to various examples, the handle 160 may be configured to engage with the attachment feature 164 such that the handle 160 aids in securing the storage member 50 within the vehicle 10. By allowing the handle 160 and/or the storage member 50 to couple or lock with the first seating assembly 14, the storage member 50 may be secured in place within the vehicle 10. Use of the examples of the storage member 60 which are not coupled to the first seating assembly 14 may be advantageous in allowing the storage member 60 to be carried away from the vehicle 10. For example, an occupant of the vehicle 10 may stow objects within the storage member 50 and under the seat base 42 while the vehicle 10 is in operation and then carry away the storage member 50 away from the vehicle 10 (e.g., as a crate and/or briefcase) after departing from the vehicle 10. Further, by allowing the storage member 50 to be removed from the member space 54, additional storage space within the vehicle 10 may be realized. It will be understood that other examples (e.g., mesh examples) of the storage member 50 described herein may be used within the examples of FIGS. 5A-5C without departing from the teachings provided herein.

Use of the present disclose may offer a variety of advantages. First, the first and second seating assemblies 14, 18 provide additional storage within the vehicle 10. Conventional seats may not include a storage space. Use of the presently disclosed seating assemblies 14, 18 provide for additional storage space both under the seat base 42 and within the space 26 between the first and second seating assemblies 14, 18. Second, the storage member 50 can be substantially hidden by the seat base 42. Conventional seats may not include a moveable storage compartment. However, use of the presently disclosed seating assemblies 14, 18 provide for the storage member 50 which may be substantially hidden from view and deployed to provide additional storage proximate the seating assemblies 14, 18. Such a feature may be advantageous to provide sufficient storage space for occupants using the first and second seating assemblies 14, 18 if there is a removable seat and/or a walkway between the first and second seating assemblies 14, 18.

According to various examples, the vehicle includes first and second seating assemblies positioned within a single seating row defining a space positioned therebetween. The vehicle can further include a storage member operable between an undeployed position within a member space defined below a seat base of the first seating assembly and a deployed position within the space between the first and second seating assemblies via a linkage. Embodiments of the present disclosure may include one or a combination of the following features:

- the first and second seating assemblies are positioned within a second seating row within the vehicle;
- the seat base is moveable between a closed position and an opened position;
- the seat base is configured to pivot in a vehicle-forward direction from the closed position to the opened position;
- the storage member is configured to move in a vehicle-inboard direction from the undeployed position to the deployed position;
- the storage member is positioned on a floor of the vehicle between the first and second seating assemblies when in the deployed position;
- the linkage is pivotally coupled to a vehicle-inboard side of the first seating assembly;
- the storage member defines a storage cavity;
- the storage member defines the storage cavity in the deployed and undeployed positions;
- a cover pivotally coupled to an edge portion of the storage member;
- the storage member is flexible;
- the storage member is configured to collapse when in the undeployed position beneath the seat base;
- the seat base is pivotable;
- the storage member is configured to keep a same orientation as the storage member moves between the undeployed position beneath the seat base and the deployed position proximate the seat base;
- the linkage comprises first and second linkages coupled to opposing sides of the storage member;
- the first and second linkages are coupled to a seating assembly-forward side and a vehicle-rearward side of the storage member, respectively;
- the storage member is positioned within a member space defined beneath the seat base when the storage member is in the undeployed position and positioned to a side of the seat base when the storage member is in the deployed position; and
- an arm rest coupled to the storage member, wherein the armrest is operable between a resting and a nonresting position.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
   first and second seating assemblies positioned within a single seating row defining a space positioned therebetween, wherein at least one of the first and second seating assemblies includes an attachment feature adjacent to the space; and
   a storage member operable between an undeployed position within a member space defined below a seat base of the first seating assembly and a deployed position within the space between the first and second seating assemblies, wherein the storage member defines a handle configured to selectively interlock with the attachment feature to secure the storage member in place in the space between the first and second seating assemblies.

2. The vehicle of claim 1, wherein the first and second seating assemblies are positioned within a second seating row within the vehicle.

3. The vehicle of claim 1, wherein the seat base is moveable between a closed position and an opened position.

4. The vehicle of claim 3, wherein the seat base is configured to pivot in a direction opposite and away from a seat back from the closed position to the opened position.

5. The vehicle of claim 1, wherein the storage member is configured to move in a vehicle-inboard direction from the undeployed position to the deployed position.

6. The vehicle of claim 1, wherein the storage member is positioned on a floor of the vehicle between the first and second seating assemblies when in the deployed position.

7. The vehicle of claim 1, wherein the linkage is pivotally coupled to a vehicle-inboard side of the first seating assembly.

8. A vehicle seating assembly, comprising:
   a seat back;
   a seat base coupled to the seat back, wherein the seat base is moveable between opened and closed positions;
   a storage member, wherein the storage member is operable between an undeployed position within a member space defined below the seat base and a deployed position to a side of the seat base via a linkage; and
   an armrest coupled to the storage member, wherein the armrest is operable between a resting and a nonresting position.

9. The vehicle seating assembly of claim 8, wherein the storage member defines a storage cavity.

10. The vehicle seating assembly of claim 9, wherein the storage member defines the storage cavity in the deployed and undeployed positions.

11. The vehicle seating assembly of claim 8, further comprising:
    a cover pivotally coupled to an edge portion of the storage member.

12. The vehicle seating assembly of claim 8, wherein the storage member is flexible.

13. The vehicle seating assembly of claim 12, wherein the storage member is configured to collapse when in the undeployed position beneath the seat base.

14. The vehicle seating assembly of claim 8, wherein the seat base is pivotable.

15. A vehicle seating assembly, comprising:
    a seat back;
    a seat base coupled to the seat back, wherein the seat base is moveable between opened and closed positions;
    a storage member pivotally coupled to a linkage, wherein the storage member is operable between an undeployed position beneath the seat base and a deployed position proximate the seat base; and
    an armrest coupled to the storage member, wherein the armrest is operable between a resting and a nonresting position.

16. The vehicle seating assembly of claim 15, wherein the storage member is configured to keep a same orientation as the storage member moves between the undeployed position beneath the seat base and the deployed position proximate the seat base.

17. The vehicle seating assembly of claim 15, wherein the linkage comprises first and second linkages coupled to opposing sides of the storage member.

18. The vehicle seating assembly of claim 17, wherein the first and second linkages are coupled to a seating assembly-forward side and a seating assembly-rearward side of the storage member, respectively.

19. The vehicle seating assembly of claim 15, wherein the storage member is positioned within a member space defined beneath the seat base when the storage member is in the undeployed position and positioned to a side of the seat base when the storage member is in the deployed position.

* * * * *